(12) United States Patent
Müller et al.

(10) Patent No.: US 7,174,541 B2
(45) Date of Patent: Feb. 6, 2007

(54) TESTING OF APPLICATIONS

(75) Inventors: Horst Müller, Schriesheim (DE); Jan Olsen, Malsch (DE); Thomas Lendroth, Leimen-Gauangelloch (DE); Marc Webster, Heidelberg (DE); Nils Kirstaedter, Berlin (DE); Jens Fichtner, Leipzig (DE); Michael Schaffrath, Leipzig (DE)

(73) Assignee: SAP Aktiengesellschaft, Waldorf (DE)

( * ) Notice: Subject to any disclaimer, the term of this patent is extended or adjusted under 35 U.S.C. 154(b) by 596 days.

(21) Appl. No.: 10/186,387

(22) Filed: Jun. 28, 2002

(65) Prior Publication Data
US 2004/0003325 A1    Jan. 1, 2004

(51) Int. Cl.
*G06F 9/44* (2006.01)
(52) U.S. Cl. ............... 717/124; 717/125; 717/126
(58) Field of Classification Search ........ 717/168–178, 717/124, 125, 126; 714/31
See application file for complete search history.

(56) References Cited

U.S. PATENT DOCUMENTS

| | | | |
|---|---|---|---|
| 6,249,882 B1* | 6/2001 | Testardi | 714/38 |
| 6,405,149 B1* | 6/2002 | Tsai et al. | 702/119 |
| 6,934,934 B1* | 8/2005 | Osborne et al. | 717/126 |
| 2004/0205406 A1* | 10/2004 | Kaliappan et al. | 714/31 |

OTHER PUBLICATIONS

Bird, et al., "An XML-based approach to automated software testing", 2001, ACM, p. 64-65.*
Ostrand, et al., "A Visual Test Development Environment for GUI Systems", 1998, ACM, p. 82-92.*
Lu, Peng "Test Case Generation for Specification-Based Software Testing", 1994, IBM Press. p. 1-10.*

* cited by examiner

*Primary Examiner*—Wei Zhen
*Assistant Examiner*—Qamrun Nahar
(74) *Attorney, Agent, or Firm*—Fish & Richardson P.C.

(57) ABSTRACT

Methods and apparatus, including computer program products, for testing a feature of a software application includes forming a feature call by incorporating test data into a data structure that is part of a test script and sending the feature call to the software application containing the feature for testing.

33 Claims, 4 Drawing Sheets

TESTING OF APPLICATIONS

BACKGROUND

The present invention relates to testing of applications.

Applications are used by computer systems, for example, to process (e.g., sort, filter, store) data. To ensure proper processing of the data, the applications are sometimes tested. In one approach to testing, known inputs are supplied to the application during execution to establish what the predicted proper outputs would be. Using these predicted outputs, another instance of the application running on a possibly different platform and running at any location may be tested by applying the same inputs to the other instance and comparing the processed outputs to the predicted outputs. The testing is done by a process that contains testing instructions that deliver a large number of tests to the application and process the results to determine whether features of the application are working properly.

When features of an application are changed or enhanced to produce an updated application or a new application version, the testing process must be updated, too. In addition, because older versions of the application may continue to be used, the original test process must be maintained and used even though a new test process has been generated.

SUMMARY OF THE INVENTION

The present invention provides methods and apparatus, including computer program products, for testing a feature of a software application which includes forming a feature call by incorporating test data into a data structure that is part of a test script, and sending the feature call to the software application containing the feature for testing.

In general, in one aspect, the invention features a computer-implemented method for testing a feature of a software application which includes forming a feature call by incorporating test data into a data structure that is part of a test script, and sending the feature call to the software application containing the feature for testing.

In general, in another aspect, the invention features a computer program product, tangibly embodied in an information carrier, for storing instructions, the computer program product being operable to cause data processing apparatus to form a feature call by incorporating test data into a data structure that is part of a test script, and send the feature call to a software application containing a feature for testing.

The invention can be implemented to include one or more of the following advantageous features. The test data may be accessed in a test data container. A system identifier may be accessed in a system data container and using the system identifier in sending the feature call. Data may be received from the software application containing the feature for testing. The received data may be compared to predetermined data to evaluate operation of the feature of the software application. The test feature may include a parameter, which may include a variant, a name, or a type. The software application and the test data container may be located separately. Alternate test data may be incorporated into the feature call and the feature call may be re-sent to the software application containing the feature for testing. The system data container may include information representing a location of the software application. Error messages may be received from the software application. The test feature call may include a variable, which way include a local or global variable. The test data may include default values.

The invention can be implemented to realize one or more of the following advantages. Using command interfaces in a test script reduces repetitive listing of test data and parameters and condenses the test scripts into manageable sizes. Also, command interfaces may be reused in the test script to improve the efficiency of creating and editing test scripts. Over testing periods, trends may emerge which repetitively use similar command interfaces that may be accessed from a library and not recreated for testing future application functions.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
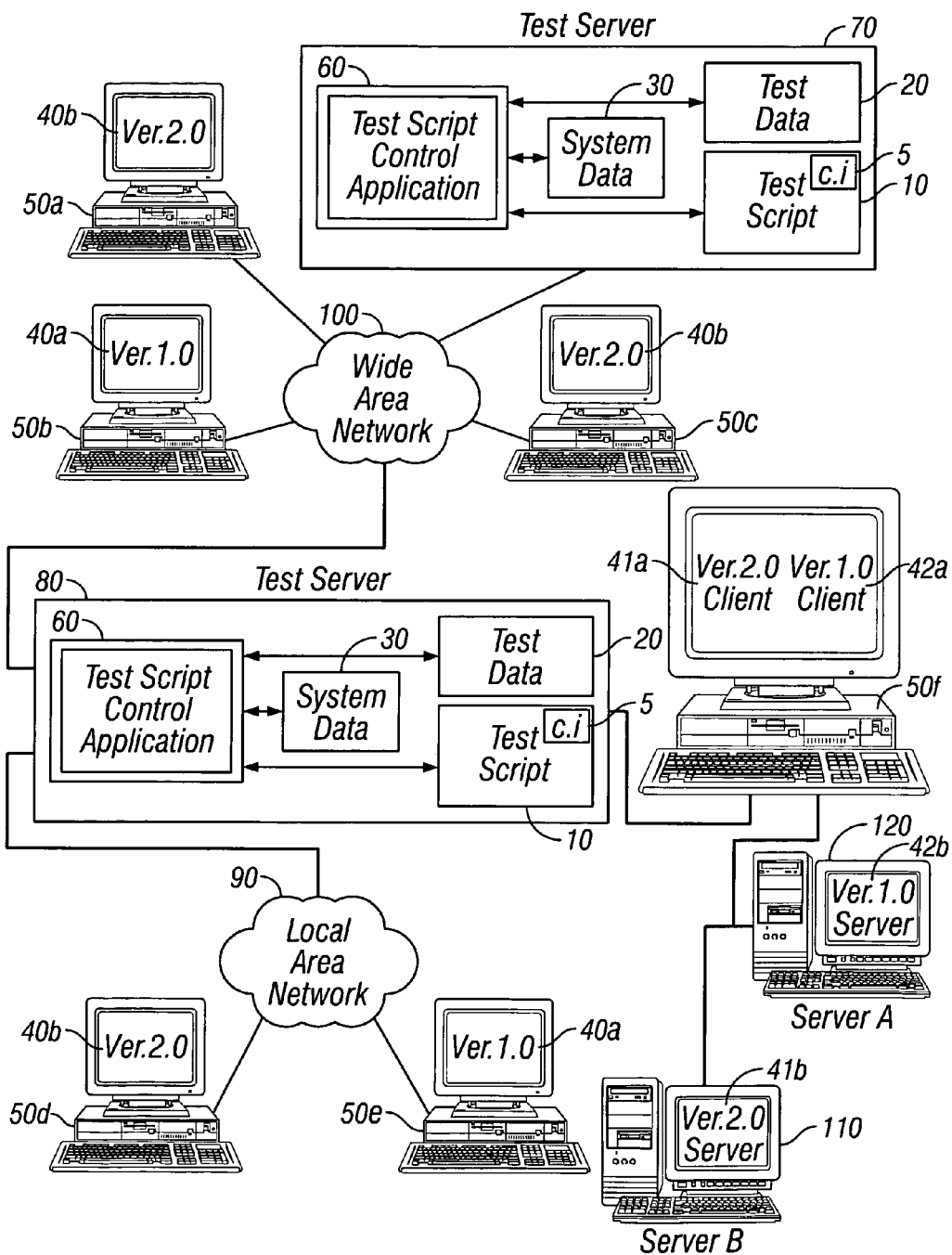
FIG. 1 is a block diagram of a server, a wide area network, and a local area network.

As shown in FIG. 1, a command interface 5 in accordance with the invention is included in a test script 10 resident on a test server 80 and may access test data 20 for testing applications 40*a,b* that are stored and executed on computers 50*a–e*. The command interface may also be used to test an application that has a client part 41*a* executing on computer 50*f* and a server part 41*b* executing on server A 110, as well as an application that has a client part 42*a* executing on computer 50*f* and a server part 42*b* executing on server B 120. The test script 10 may be executed by a test script control application 60 stored on the remote test server 80 or on a local test server 70. The local test server 70 may test, for example, older versions of an application 40*a* or newer versions of the application 40*b* stored on the computers 50*a–c*. By connecting the computers 50*a–f* directly or through networks to the local and remote test servers 70, 80 the applications 40*a*, 40*b* may be tested over relatively short distances of a local area network (LAN) 90 or over larger distances of a wide area network (WAN) 100. Regardless of the distances, the command interface 5 included in the test script 10 allows test personnel to efficiently design, store, and execute the test script 10 for the various applications under test.

Figure 2:
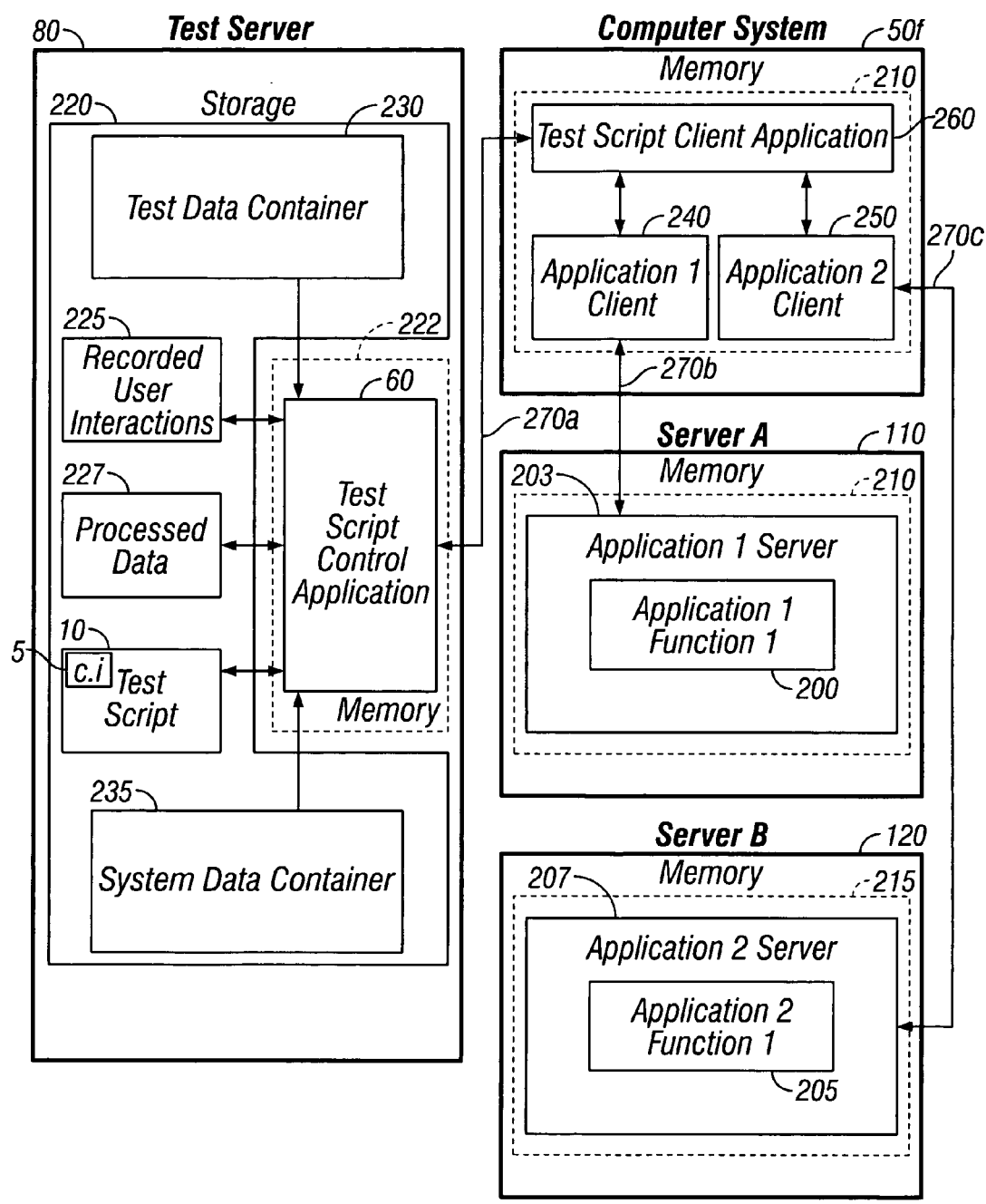
FIG. 2 is a block diagram of a server and two computer systems.

Referring to FIG. 2, the test script 10, which includes the command interface 5, is created, stored, and executed by the test script control application 60, resident in memory 222 on test server 80, in order to test applications functions 1 and 2 200, 205 of respective application servers 1 and 2 203, 207 that reside in respective memories 210, 215 on server A 110 and server B 120. Application servers 1 and 2 203, 207 are accessed over respective Ethernet cables 270*b, c* and interact with a user through respective application clients 1 and 2 240, 250 that reside in a memory 210 of computer system 50*f*. The application clients 240, 250 transfer data to and from a test script client application 260 that transfers data to and from the test script control application 60. In some implementations the test script client application 260 records user-interactions 225, for use in test scripts, that occurred between a user and the application functions 1 and 2 200, 205 through the application clients 240, 250.

Often, the test script 10 may be created by a test manager prior to testing and is stored in storage 220 on the test server 80. To create the test script 10, the test manager may review the previously recorded user-interactions 225 that have been stored, for example, in storage 220. In some implementations, the previously recorded user-interactions 225 may be incorporated into the test script 10 as known inputs for testing the application functions 1 and 2 200, 205.

To prepare for testing, a test manager recalls the test script 10 from the storage 220 and, if necessary, edits the test script using the test script control application 60. For example, the test manager may edit the command interface 5 in the test script 10 for the particular application under test. Next, the test manager causes the test script 10 to be executed, which causes the command interface 5 to pass input data to the application function under test. The test script 10 may also use data stored in a system data container 235 to determine to which computer system to pass the input data. The command interface 5 may also specify storage locations for returning processed data 227 from the application functions 200, 205 under test. Once returned, the processed data 227 may be compared to predetermined results to determine if the application functions are properly operating. The test data and the processed data may be retrieved and passed over Ethernet cable 270a that interconnects the test server 80, the computer system 50f.

In general, to determine proper operation, the application functions 200, 205 may be executed more than once for various test scenarios. Typically, the various test scenarios are applied by calling the application functions 1 and 2 200, 205 multiple times. Each time one of the functions is called from the test script 10, for a test scenario, the command interface 5 passes different input data. However, increasing the amount of input data, due to the multiple function calls, increases the complexity of managing the input data within the test script 10. Also, listing the multiple functions in the test script 10 may result in long repetitive test scripts.

To manage the large volume of input data due to the multiple function calls, the command interface 5 associated with each function call in the test script 10 may be used repetitively to access different input data for each of the test scenarios. By accessing the relevant input test data using a single command interface 5, the test script 10 is more condensed with less listings of repetitive test data and input parameters.

To execute the test scenarios, test personnel may also select which application to test. For example, test personnel may edit and execute the test script 10 for testing both application functions 1 and 2 200, 205. However, in another example, test personnel may edit the test script 10 for testing the application function 1 200 on the computer system 5Of and not application function 2 205. After either or both of the application functions 200, 205 have been executed, data may be returned over the Ethernet cables 270a for comparison testing with predetermined results or for comparison testing of the results from each application function.

Figure 3:
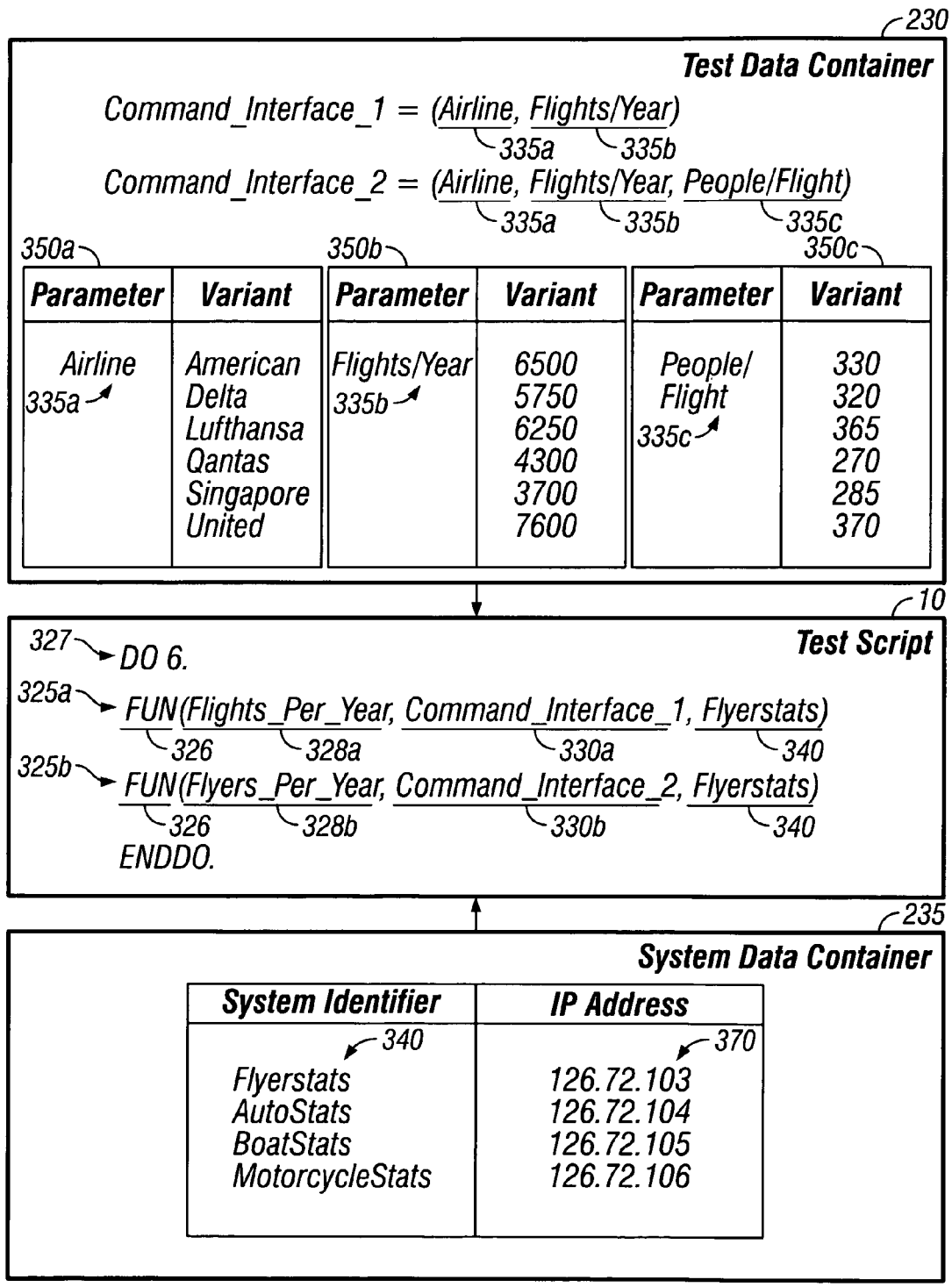
FIG. 3 is a diagram of a test data container, a system data container, and a test script.

Referring to FIG. 3, a specific example of a test script 10 is shown that may test two application functions for multiple test scenarios by executing only two respective function calls 325a, b. Each of the two function calls 325a, b includes a driver command 326 "FUN" which is a test script control application 60 (shown in FIGS. 1–2) command for executing respective application functions 328a, b. The two function calls 325a,b also include two respective command interfaces 330a,b that access data in a test data container 230 and a computer system identifier 340 that is interpreted according to computer system information in a system data container 235. As shown for example, the first function call 325a executes the function 328a named "Flights_Per_Year" and the second function call 325b executes the function 328b named "Flyers_Per_Year".

As shown in test data container 230, each of the command interfaces 330a, b corresponds to respective parameters 335a–c. The parameters 335a–c may access data contained in the test data container 230 in the figure. When the test script 10 is executed, for example, by the test script control application 60 (shown in FIGS. 1 and 2), the computer system identifier 340 identifies the computer system(s) where the respective application functions are resident by retrieving information in the system data container 235, and the command interfaces 330a, b are used to retrieve test data, stored in the test data container 230, to transfer to the respective functions 328a, b. In one example, the parameters 335a–c may be created from the information stored in the recorded user actions 225 (shown in FIG. 2).

The parameters 335a–c may, for example, represent a number of respective variants 350a–c, which may have been determined to be statistically significant user interactions with the application functions. The variants 350a–c of the parameters 335a–c may be stored in the test data container 230 and may be passed individually by the command interfaces 330a, b to the functions 328a, b. For example, the parameter "airline" 335a includes six variants 350a listed in the test data container 230. Similarly the parameters "flights/year" 335b and "people/flight" 335c have corresponding variants 350b, c which may be individually passed by the command interfaces 330a, b during separate function calls.

In another example (not shown), a test script may directly assign values to parameters in command interfaces rather than reading values from the test data container 230. In the example in FIG. 3, the test script 10 includes a "Do" loop command 327 that executes the function calls 325a, b six times while the command interfaces 330a, b sequentially transfer a different variant of parameters 335a–c to the functions "Flights_Per_Year" and "Flyers_Per_Year" for each of the six loop executions. For example, the first time the first function call 325a is executed, the first variant 350a character string ("American") of the "airline" parameter 335a is fetched and the first variant 350b integer ("6500") of the "flights/year" parameter 335b is fetched. During the second execution of the "do" loop 327, the first function call 325a is executed a second time and the second variant 350a character string ("Delta") of the "airline" parameter 335a and the second variant 350b integer ("5750") of the "flights/year" parameter 335b are fetched.

To determine which computer system is to be tested, the location of the computer system, for example, where the function under test resides or executes is fetched from the computer system identifier "flyerstats" 340. In this example, both of the function calls 325a, b contain the "flyerstats" computer system identifier 340 which accesses computer system information contained in the system data container 235. Here, the "flyerstats" computer system identifier 340 accesses an internet protocol (IP) address 370 of a computer system which stores the two application functions 328a, b. When the function calls 325a, b are executed, the "flyerstats" computer system identifier 340 provides the function calls with the IP address 126.72.103.

When test script 10 is executed, the first function call 325a executes the function "Flights_Per_Year" 328a and passes the first variant 350a character string ("American") of the "airline" parameter 335a, the first variant 350b integer ("6500") of the "flights/year" parameter 335b, and IP address 370 ("126.72.103") of the "flyerstats" computer system identifier 340. After the first function call 325a is executed, the second function call 325b executes the function "Flyers_Per_Year" 328b and passes the first variant 350a character string ("American") of the "airline" parameter 335a, the first variant 350b integer ("6500") of the "flights/year" parameter 335b, the first variant 350c integer ("330") of the "people/flight" parameter 335c, and the IP address 370 ("126.72.103") of the "flyerstats" system identifier 340. Although the second function call 325b requires additional data passed to the "Flyers_Per_Year" function 328b compared to the data passed to the "Flights_Per_Year" function 328a, the test script 10 remains relatively condensed since each function call 325a, b includes one respective command interface 330a, b.

In this example the "Do" loop 327 causes the first function call 325a to execute five more times for the five remaining variants 350a ("Delta", "Lufthansa", "Quantas", "Singapore", and "United") of the "airline" parameter 335a and the remaining five variants 350b ("5750", "6250", "4300", "3700", "7600") of the "flights/year" parameter 335b. The second function call 325b is also executed five more times for the five remaining variants 350a ("Delta", "Lufthansa", "Quantas", "Singapore", and "United") of the "airline" parameter 335a, the remaining five variants 350b ("5750", "6250", "4300", "3700", "7600") of the "flights/year" parameter 335b, and the remaining five variants 350c ("320", "365", "270", "285", "370") of the "people/flight" parameter 335c. Also, when executed both function calls 325a,b continue to access the computer system at IP address 126.72.103 as provided by the "flyerstats" computer system identifier 340.

Figure 4:
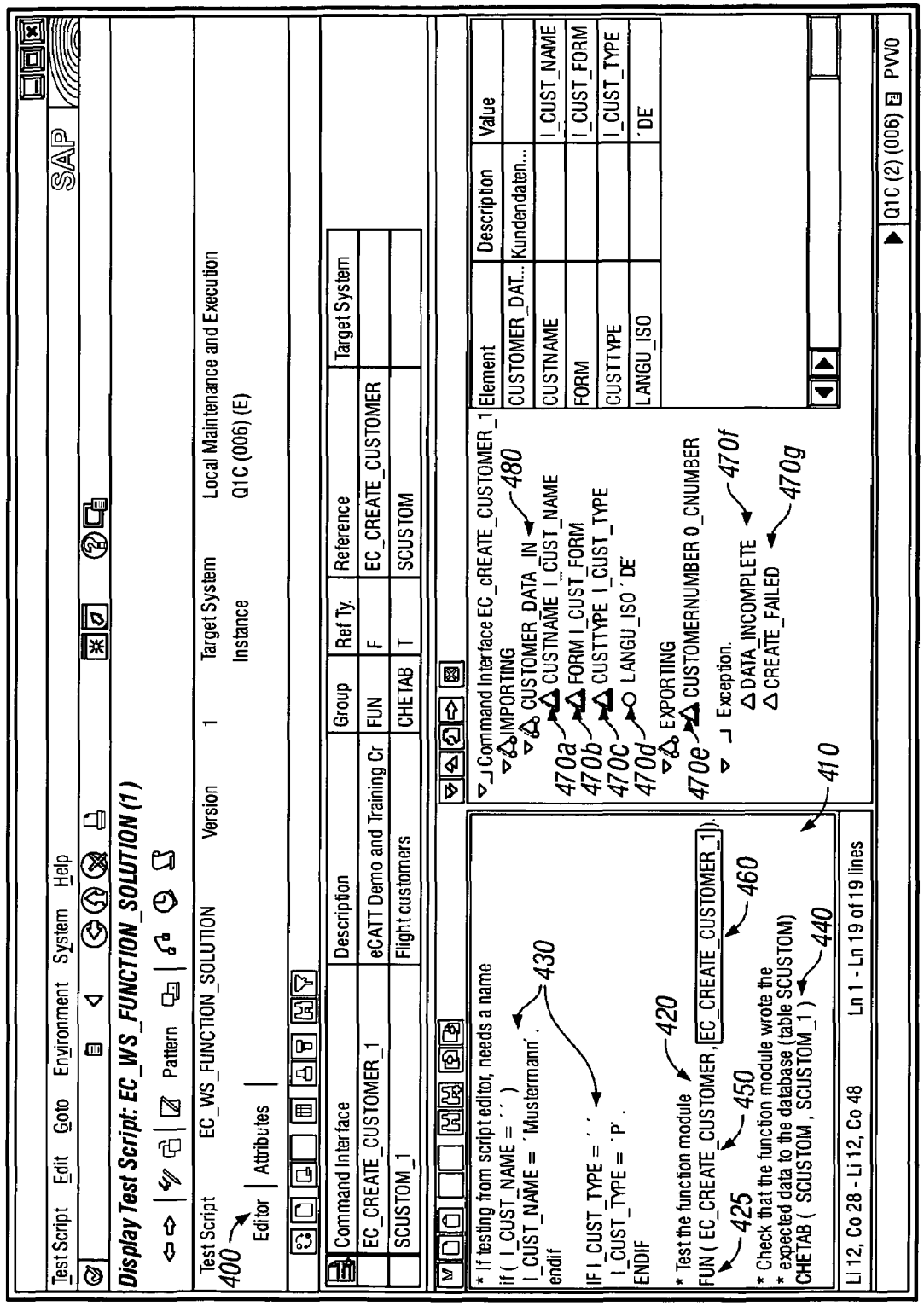
FIG. 4 is a screen display for a test script editor.

Referring to FIG. 4, a test script control application 60 (shown in FIGS. 1 and 2) is exposed to the user through a browser window in the form of a test script editor 400. The test script editor 400 is shown accessing a test script 410 named EC_WS_FUNCTION_SOLUTION(1) which includes a function call 420, conditional commands 430, and a routine call 440 to determine if a function operated properly. The function call 420 uses a driver command "FUN" 425 to execute a function 450 named "EC_CREATE_CUSTOMER" with data passed from a command interface named "EC_CREATE_CUSTOMER_1" 460. In this example, the test script editor 400 also displays parameters 470a–g used by the command interface "EC_CREATE_CUSTOMER_1" 460 to import 470a–d and export 470e data to and from the application function "EC_CREATE_CUSTOMER" 450. The command interface 460 also includes parameters 470f, g for checking error flags in the application function 450. In this example, the import parameters 470a–d are combined into a single node 480 named "CUSTOMER_DATA_IN" which allows a test manager to efficiently insert the dour importing parameters 470a–d into a command interface. Each of the parameters 470a–g may be assigned, for example, a string, a variable, a constant value, a condition value (e.g., "true" or "false"), or other similar structure.

Other implementations are also within the scope of the following claims.

For example, the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention may be performed by one or more programmable processors executing a computer program to perform functions of the command interface by operating on input data and generating output. Method steps can also be performed by, and apparatus of the command interface 330a can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

In the implementation discussed in conjunction with FIG. 2, the test data container 230, the test script 10, and the system data container 235 were stored on the test server 80. However, in other implementations these items may be stored individually or in combination on one or more of the computer systems under test 50a–f, the server A and B 110, 120, or on other similar digital storage systems. In another implementation, the application functions 200, 205 under test may be stored on the test server 80 or on other similar digital storage systems.

The invention may be implemented in a computing system that includes a back-end component, e.g., as a data server, or includes a middleware component, e.g., an application server, or includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In FIGS. 1–3, test script 10 may be created in a flexible computer language, such as extensible markup language (XML) to provide a test script that may be executed on various types of computer platforms. In one example, the test script editor 400 shown in FIG. 4 may be capable of creating and editing XML test scripts.

In FIG. 3, variants 350*a* of the "airline" parameter 335*a* were character strings and the variants 350*b*, 350*c* of the "flights/year" parameter 335*b* and the "people/flight" parameter 335*c* were integers. However, in other implementations, variants may include, individually or in combination, short integers, long integers, short and/or long floating point numbers, arrays, pointers, structures, function calls, command interfaces, applications, or other similar data types. Parameters may also be of a fixed data type, such as one particular default value, which may be provided by the test data container 230, the test script 10, or entered by the test manager. Also, parameters and variants may include global variables and local variables.

Also in FIG. 3, test script 10 includes the command interfaces 330*a, b* which import data when the function calls 325*a,b* execute the functions "Flights_Per_Year" 328*a* and "Flyers_Per_Year" 328*b*. However, as shown in FIG. 4, the command interfaces 330*a,b* may also include parameters to export data from the functions, import and export data to and from the functions, pass error messages and flags between the test script and the function under test, or perform other similar information transfers. In another example, local and global variables may be transferred to the application functions by the command interfaces 330*a, b*.

In FIG. 2, the test script 10, the test data container 230, and the system data container 235 are stored in storage 220 of the test server 80. In other implementations, these items may be stored individually or in combination on separate storage devices. For example, the test script 10 may be stored on a hard disk drive while the test data container 230 and the system data container 235 are stored in a CD-ROM on a separate computer system. Also, by storing the test script 10 in storage 220, the test script may be retrieved for future application testing without re-creating the test script. In still another example, the test script 10 may be retrieved and incorporated into another test script.

In FIG. 3, system data container 235 includes IP addresses of the computer systems where the particular application under test resides. However, in other implementations, a physical location of the computer system, a processor identifier, a test time for the application, or other similar information may be stored individually or in combination on the system data container 235.

In FIG. 3, the driver command "FUN" 326 executes the function calls 325*a*, 325*b* for testing the application functions 328*a*, 328*b*. However, the test script 10 may also include a driver command to execute object methods, test business application programming interfaces (BAPIs), application and database transactions, graphical user interfaces (GUIs), external applications which use certified interfaces, or other similar features of a software application. In such embodiments, a command interface may contain call content such as parameters to be passed to methods, fields to be passed to database management systems, or screens and other, possibly nested graphical components to be passed to a graphical presentation layer.

The invention has been described in terms of particular embodiments. Other embodiments are within the scope of the following claims. For example, the steps of the invention can be performed in a different order and still achieve desirable results.

What is claimed is:

1. A computer-implemented method comprising:
   executing a test script to test a software application, the test script including a script command for executing an application function to test a feature of the software application, the script command having a parameter identifying the application function to be executed, the script command further having a parameter identifying command interface, the command interface being operable to access test data for testing the application function each time the script command is executed;
   forming a feature call of the application function by executing the script command during execution of the test script to form the feature call including test data accessed by the command interface;
   accessing a system identifier; and
   sending the feature call to the software application, using the system identifier in sending the feature call.

2. The computer-implemented method of claim 1 further comprising:
   the command interface accessing the test data in a test data container.

3. The computer-implemented method of claim 2 wherein the software application and the test data container are located separately.

4. The computer-implemented method of claim 1 further comprising:
   accessing the system identifier in a system data container.

5. The computer-implemented method of claim 4 wherein the system data container includes information representing a location of the software application.

6. The computer-implemented method of claim 1 further comprising:
   receiving data from the software application containing the feature for testing.

7. The computer-implemented method of claim 6 further comprising:
   comparing the received data to predetermined data to evaluate operation of the feature of the software application.

8. The computer-implemented method of claim 1 wherein the test data includes a parameter.

9. The computer-implemented method of claim 8 wherein the parameter includes a variant.

10. The computer-implemented method of claim 8 wherein the parameter includes a name.

11. The computer-implemented method of claim 8 wherein the parameter includes a type.

12. The computer-implemented method of claim 1 further comprising:
    executing the script command in the test script multiple times to incorporate alternate test data into the feature call each of the multiple times; and
    re-sending the feature call to the software application each of the multiple times.

13. The computer-implemented method of claim 1 method further comprising:
    receiving error messages from the software application.

14. The computer-implemented method of claim 1 wherein the feature call includes a variable.

15. The computer-implemented method of claim 14 wherein the variable comprises a local variable.

16. The computer-implemented method of claim 14 wherein the variable comprises a global variable.

17. The computer-implemented method of claim 1 in which the test data comprises default values.

18. A computer program product, tangibly embodied in a machine-readable storage device, for storing instructions, the computer program product being operable to cause data processing apparatus to:
  execute a test script to test a software application, the test script including a script command for executing an application function to test a feature of the software application, the script command having a parameter identifying the application function to be executed, the script command further having a parameter identifying command interface, the command interface being operable to access test data for testing the application function each time the script command is executed;
  form a feature call of the application function by executing the script command during execution of the test script to form the feature call including test data accessed by the command interface;
  access a system identifier; and
  send the feature call to the software application, using the system identifier in sending the feature call.

19. The computer program product of claim 18, wherein the computer program product is further operable to cause the command interface to access the test data in a test data container.

20. The computer program product of claim 18, wherein the computer program product is further operable to cause data processing apparatus to:
  access the system identifier in a system data container.

21. The computer program product of claim 20 wherein the system data container includes information representing a location of the software application.

22. The computer program product of claim 18, wherein the computer program product is further operable to cause data processing apparatus to:
  recieve data from the software application containing the feature for testing.

23. The computer product of claim 22, wherein the computer program product is further operable to cause data processing apparatus to:
  compare the received data to predetermined data to evaluate operation of the feature of the software application.

24. The computer program product of claim 18 wherein the test data includes a parameter.

25. The computer program product of claim 24 wherein the parameter includes a variant.

26. The computer program product of claim 24 wherein the parameter includes a name.

27. The computer program product of claim 24 wherein the parameter includes a type.

28. The computer program product of claim 18, wherein the computer program product is further operable to cause data processing apparatus to:
  execute the script command in the test script multiple times to incorporate alternative test data into the feature call of the multiple times; and
  re-send the feature call to the software application each of the multiple times.

29. The computer program product of claim 18, wherein the computer program product is further operable to cause data processing apparatus to:
  receive error messages from the software application.

30. The computer program product of claim 18, wherein the feature call includes a variable.

31. The computer program product of claim 30, wherein the variable comprises a local variable.

32. The computer program product of claim 30, wherein the variable comprises a global variable.

33. The computer program product of claim 18 in which the test data comprises default values.

* * * * *